United States Patent [19]

Tucker

[11] Patent Number: 4,477,343

[45] Date of Patent: Oct. 16, 1984

[54] FILTER BACKWASH MEANS

[75] Inventor: Alfred D. Tucker, Kersbrook, Australia

[73] Assignee: Ris Irrigation Systems Pty. Limited, Elizabeth, Australia

[21] Appl. No.: 336,447

[22] Filed: Dec. 31, 1981

[51] Int. Cl.³ .............................................. B07B 1/00
[52] U.S. Cl. ................................... 210/108; 210/278; 210/393; 210/425; 210/427
[58] Field of Search ................ 137/489, 491; 210/108, 210/275, 277, 278, 333.01, 393, 425-427

[56] References Cited

U.S. PATENT DOCUMENTS 3,175,514  3/1965  McMurry ............................. 137/155
4,226,259 10/1980  Szekely et al. ....................... 137/489

Primary Examiner—Frank Sever
Attorney, Agent, or Firm—Jay L. Chaskin

[57] ABSTRACT

An inlet pipe having two branch pipes and an outlet pipe having two branch pipes, between the inlet and outlet pipes of each branch, there being a dump valve and a dump control valve, each outlet branch pipe containing in it a filter, the dump control valve sensing the pressure on each side of the filter and being operable, on pressure differential building up, to open the dump valve; by opening of either one of the dump valves, the water will flow through the inlet tube, the inlet branch tube of the outer dump valve and rearwardly through the filter element. The filter element will thereby be backwashed, and the particulate material which has been built up will be at least partly discharged through the dump valve to drain.

13 Claims, 4 Drawing Figures

FILTER BACKWASH MEANS

This invention relates to filter backwash means which is suitable for effecting backwash of a filter such as is used in an irrigation system, the filter being of the type having an inlet pipe and an outlet pipe.

BACKGROUND OF THE INVENTION

When irrigating in agricultural or horticultural work, there is frequently a need to filter water which is to be discharged, since the water can sometimes contain large amounts of suspended matter which would otherwise block discharge orifices. In some instances the suspended matter is present in such large quantities that it is necessary to be able to quickly and easily backwash the filter, washing away debris which has been restrained as water flows through the filter. The filters which are most commonly used are the so called gauze filters and the so called sand filters.

The main object of this invention is to provide means which will effectively backwash a filter upon the pressure drop across that filter reaching a certain level, so that the backwash is automatic. It is a further object of this invention to provide means which are likely to be effective and functional under a wide range of conditions and which will require only a small amount of maintenance.

BRIEF SUMMARY OF THE INVENTION

In this invention there is provided filter backwash means which comprises both a dump valve and a dump control pilot valve. The dump valve has a valve member which is pressure actuated by pressure directed thereto from the pilot valve. The pilot valve is also pressure actuated by pressure differential between the inlet and outlet pipes of the filter the pressure in the outlet pipe urging the pilot valve member towards a closed position while the pressure in the inlet pipe urges it towards an open position. When the pressure differential increases, the valve lifts from its seat and exposes a venting aperture which vents flow of liquid from the inlet pipe pressure zone so that the valve again closes. During the period that the pilot valve is open however there is a reversal of flow through the filter in the case of a sand filter, or a through flow through a gauze filter, in both instances rapidly removing debris collected by the respective filters.

In one embodiment of the invention the dump valve is a diaphragm operated valve and the pilot valve is mounted on the dump valve and controls it by releasing water from a space above a diaphragm to allow opening of the valve, while in another embodiment the pilot valve in turn operates a spool valve which in turn operates a dump valve, the dump valve being a double acting two way valve attached to the filter, and operated by a ram in turn operated by the spool valve. It will be seen that many other configurations lie within the invention.

More specifically, in this invention filter backwash means suitable for effecting backwash of an irrigation system filter having inlet and outlet pipes, comprises:

a pressure actuated dump valve having a housing, a valve seat in the housing, a dump valve member co-operable with the valve seat, and pressure actuated means operatively coupling the dump valve member and housing and controlling opening or closing of the dump valve, a pressure actuated dump control pilot valve comprising a pilot valve housing having a pilot valve seat, an inlet pressure zone and an outlet pressure zone within the pilot valve housing, an axially movable valve lifting member within the pilot valve housing, a pilot valve member operatively coupled to the valve lifting member, conduit means in fluid flow communication between said outlet pressure zone and said outlet pipe directing hydraulic pressure derived from said outlet pipe against said valve lifting member to urge said valve lifting member in a closing direction of said pilot valve, further conduit means in fluid flow communication between said inlet pressure zone and said inlet pipe directing hydraulic pressure derived from said inlet pipe against said valve lifting member to urge said valve lifting member in an opening direction of said pilot valve, and walls defining a vent aperture extending from said pilot valve seat directing a venting flow of fluid from said inlet pressure zone upon opening of said pilot valve, due to increase in differential between the pressures in the inlet and outlet zones, and said venting flow so reduces the opening pressure controlling the dump valve that the dump valve again closes.

The advantage of this invention over prior art presently known to the applicant is that it provides a very effective control for automatic backwash of filters, which is found to be almost maintenance free even under very bad operating conditions. In both the directly controlled dump valve of the first embodiment of FIGS. 1 and 2, and the servo-actuated dump valve of FIGS. 3 and 4, the valves function automatically and with a "snap action" upon increase of differential in the pressures of the inlet and outlet pipes of the filter.

BRIEF DESCRIPTION OF THE DRAWINGS

Two embodiments of the invention are described hereunder in some detail with reference to and are illustrated in the accompanying drawings in which.

Figure 1:
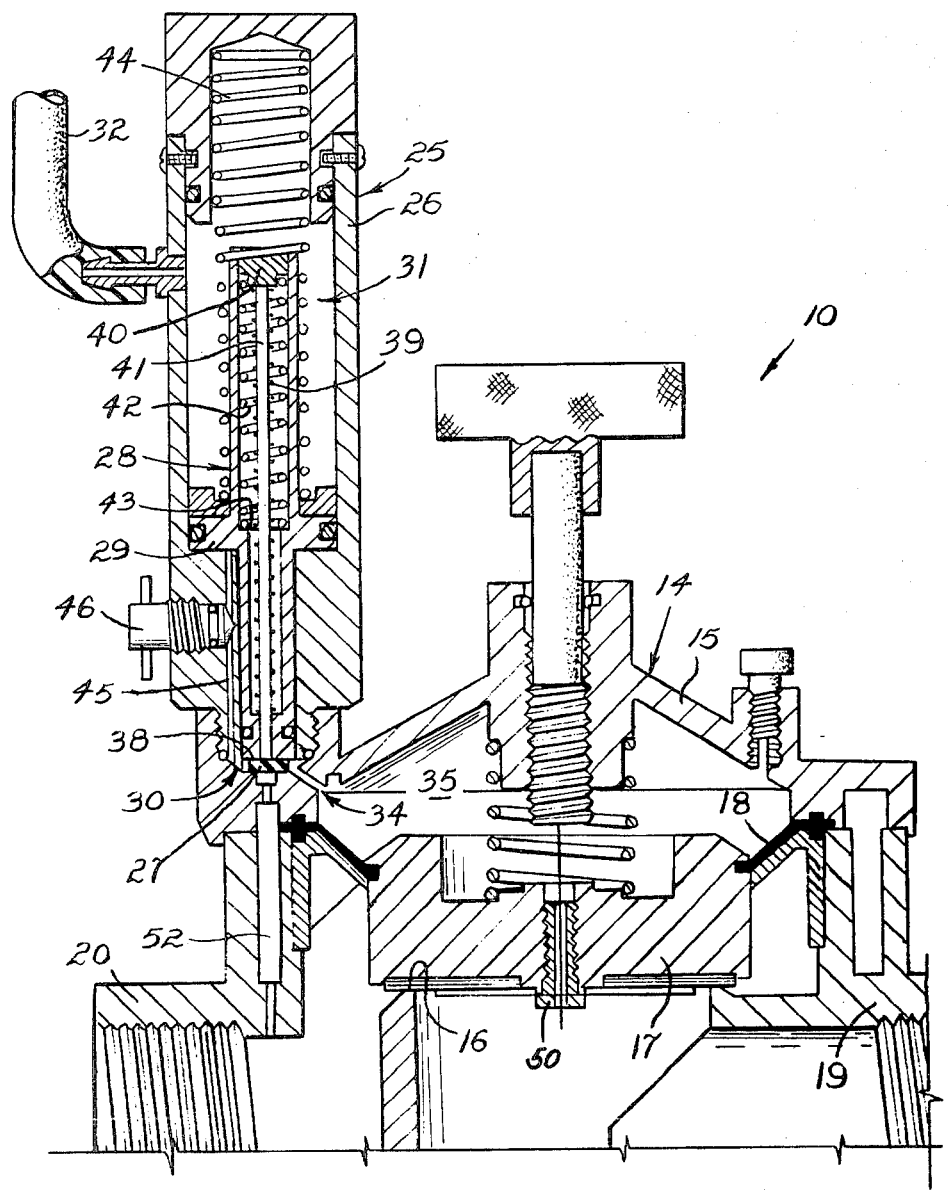
FIG. 1 is a central section through a dump valve and a dump control pilot valve mounted thereon, suitable for use on a mesh type filter.
Figure 2:
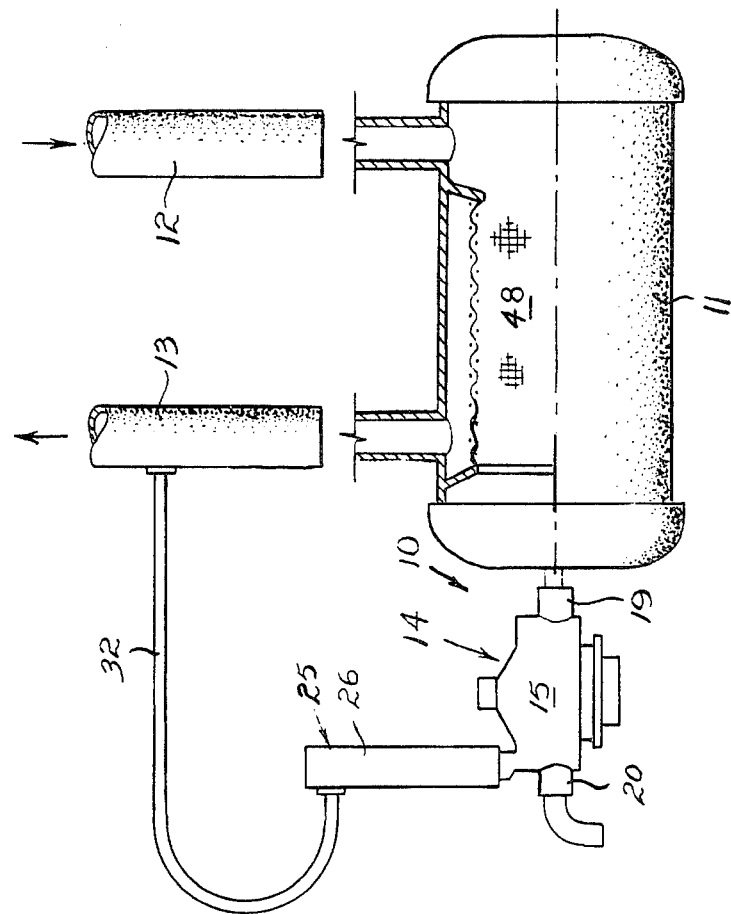
FIG. 2 is a diagrammatic representation of an assembly showing a filter coupled to the valve of FIG. 1.

A dump control pilot valve 25, also pressure actuated, is mounted on the housing 15 of the dump valve 14, and itself comprises a pilot valve housing 26 having therein a pilot valve seat 27 and an axially movable valve lifting member 28 which includes as a pressure responsive means, a piston 29, the piston 29 dividing the space within the housing 26 into an inlet pressure zone 30 (of relatively small size) and an outlet pressure zone 31. A conduit 32 places the outlet pressure zone 31 into fluid flow communication with the outlet pipe 13, such that the outlet pressure zone 31 always contains fluid at the same pressure as that in the outlet pipe 13 adjacent the filter 11. Walls which define a bleed aperture 34 leading from the diaphragm space 35 between the diaphragm 18 and housing 15 of the dump valve on the one hand, and the inlet pressure zone 30 on the other hand, constitute a conduit therebetween so that the inlet pressure zone 30 has the same pressure as the inlet conduit 19 of the dump valve 14, and as can be seen from FIG. 2, this conduit is in communication with the inlet pipe 12 through the central part of the filter 11, so that until such time as the pilot valve 25 opens, the inlet pressure zone is subject to inlet pressure.

The valve lifting member 28 is coupled to the pilot valve member 38 through two concentric springs, one being a very light or "hair" spring 39 which continuously bears upwardly against a head 40 on the upper end of a stem 41, the lower end of which stem carries a pilot valve member, and a relatively stiff "trigger" spring 42 which becomes compressed only when engaged by a shoulder 43 within the valve lifting member 28 after initial movement of that member. The valve lifting member 28 however is normally urged downwardly in a closing direction of the pilot valve, not merely by the pressure within the outlet pressure zone 31, but also by the valve closure spring 44. A gallery 45 extends upwardly through the housing 26 so that fluid in the inlet pressure zone 30 has access to the underside of the piston 29. The metering screw 46 controls the flow rate through the gallery 45 to restrain return movement of the piston 29.

In operation, irrigating water passes into the filter 11 from the inlet pipe 12, through the central portion of the filter and outwardly through the cylindrically shaped mesh cartridge 48, to discharge from the filter through the outlet pipe 13. The pressure which exists in the inlet pipe 12 is transferred through the centre part of the filter 48 into the dump valve inlet conduit 19, upwardly through a central aperture in a metering screw 50 in the centre of valve member 17, and into the diaphragm space 35 of the dump valve. It is then metered through, the bleed, aperture 34 into the pressure zone 30, (of which gallery 45 forms part) and bears upwardly against the piston 29 urging the valve lifting member 28 in an upward direction. While there is only a small pressure difference between the inlet pressure zone 30 and the outlet pressure zone 31, the piston will remain in the position shown, and the downward pressure of the spring 44 will also assist in retaining this condition. It will be noted that the effective cross sectional area above the valve lifting member 28 exceeds that below it because of the area of the valve seat 27. However, if debris is collected on the inner wall of the mesh cartridge 48, the pressure difference between the inlet and outlet pipes 12 and 13 will increase, and this will be reflected within the respective pressure zones 30 and 31 until the piston 29 will be forced upwardly within the housing 26. Initial movement will have no bearing on the position of the pilot valve member 38, which will be held downwardly against the valve seat 27 by hydraulic pressure, notwithstanding the small amount of pressure exerted upwardly by the light spring 39. However when the trigger spring 42 is engaged by the shoulder 43, much greater force is imparted and the hydraulic pressure holding valve member 38 down is overcome, so that the valve member 38 will be lifted upwardly away from the valve seat 27 by the valve lifting member 28, and this will then expose the venting aperture 52 through the inlet pressure zone 30, allowing the water therein to vent outwardly through the outlet conduit 20. This release of pressure fluid will also allow the diaphragm space 35 to empty as the inlet pressure bears upwardly on the dump valve member 17, and, this valve member will move upwardly.

Although there will be very little upward pressure acting on the piston 29, at that same time almost zero pressure acting downwardly on the piston because of absence of flow through the outlet pipe 13, the piston 29 will gradually be urged downwardly but by the effect of the valve closure spring 44. This downward motion will be restrained by the restriction to the flow of liquid from beneath the piston 29, by the metering screw 46. After a period of time which may be two or three minutes, the valve member 38 will once again close against its valve seat 27, but in the meantime the rapid outward flow of water will scour the inner wall of the cartridge 48 and clear the filter from the accumulated debris.

The above described embodiment relates to an arrangement wherein the pilot valve 25 directly controls the dump valve 10 by release of pressure fluid from the diaphragm space 35. In the second embodiment however, use is made of a servoaction in that the pilot valve 55, which again is a pressure actuated pilot valve, controls a spool valve 56 which in turn controls a ram 57 coupled to a stem 58, the upper end of the stem having on it a valve member 59 and an upper valve 60 between the inlet conduit 61 and the upper end of the filter 62. The lower end of the stem 58 has on it a valve member 64 which co-operates between two valve seats in a lower valve 65 between the lower end of the filter 62 and the outlet conduit 66. The arrangement is such that pressure applied to the top of the ram 57 will drive the stem 58 downwardly from the position shown, changing over the flow from downward flow through the filter 62 to an upward flow, and the upward flow being discharged through the discharge pipe 67, so that the upper valve 60 and lower valve 65 combine to make a change over valve which incorporates a dump valve.

Figure 3:
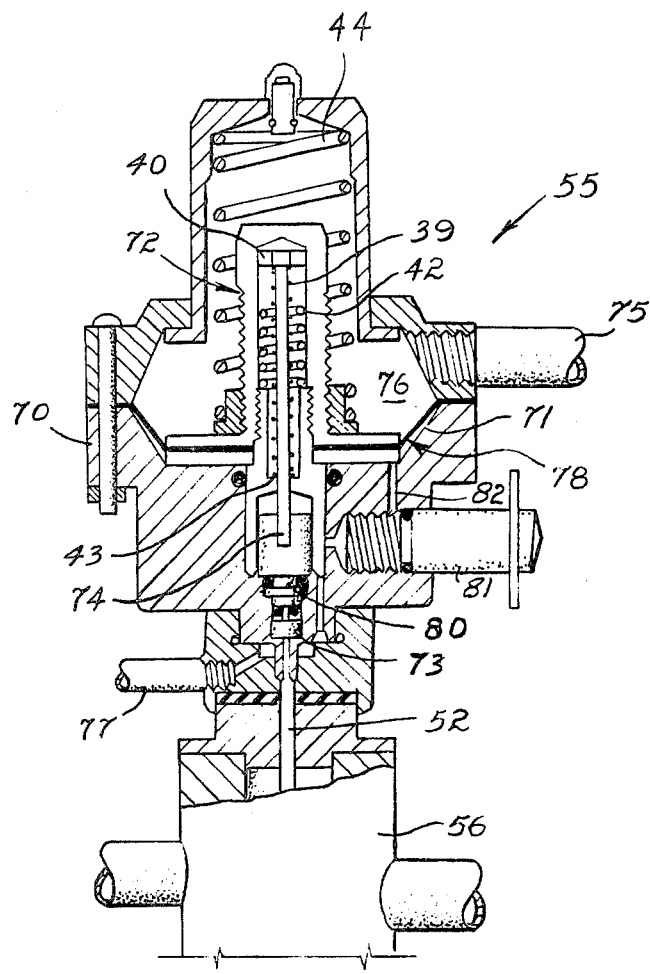
FIG. 3 shows a second embodiment wherein a pressure actuated dump control pilot valve is coupled to a spool valve.
Figure 4:
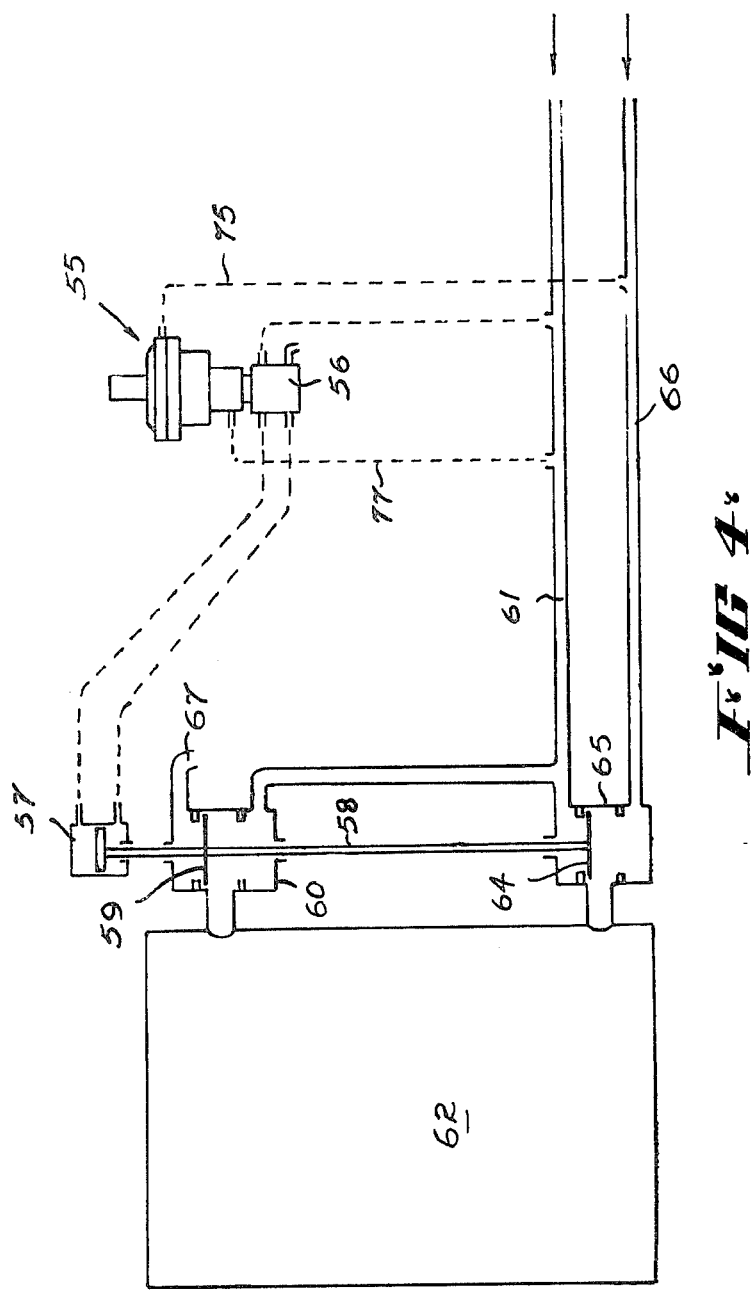
FIG. 4 shows in diagrammatic form an installation utilising the pilot valve of FIG. 3. Referring first to the embodiment of FIGS. 1 and 2, filter backwash means 10 suitable for effecting backwash of a filter 11 of the mesh type which has an inlet pipe 12 and an outlet pipe 13, comprises a dump valve 14 having a housing 15, a valve seat 16 within the housing, a dump valve member 17 which is co-operable with a valve seat 16 to open and close the dump valve, and a diaphragm 18 interconnecting the dump valve member 17 and the housing 15, and being pressure actuated to effect opening or closing of the dump valve. When open, fluid may flow from the inlet conduit 19 of the dump valve 14, between the valve seat 16 and the valve member 17, and outwardly through the outlet conduit 20.

Reference is now made to FIG. 3 wherein the pressure actuated dump control pilot valve 55 is shown in more detail.

The pilot valve 55 comprises a housing 70 containing a diaphragm 71 which is a pressure responsive means performing the function of the piston 29 in the first embodiment. It should be noted that the diaphragm 71 does not perform the function of the diaphragm 18 of the first embodiment.

The diaphragm 71 forms portion of a valve lifting member generally designated 72, the valve lifting member 72 being coupled to a valve member 73 through a stem 74. A conduit 75 leads into the space above the diaphragm 71, the conduit 75 extending to the outlet pipe 66, such that the space 76 above the diaphragm 71 is an outlet pressure zone. Similarly the conduit 77 connects to the conduit 61 and makes a space below the diaphragm 71 the inlet pressure zone 78.

The stem 74 is surmounted by a head also designated 40, and the light hair spring 39 bears between the shoulder 43 and the head 40 as in the first embodiment. Similarly the trigger spring 42 functions in the same way as in the first embodiment and the spring 44 also functions in the same way. A gallery 82 extends upwardly thorough the housing 70 so that fluid in the inlet pressure zone 78 has access to the underside of the diaphragm 71. The metering screw 81 controls the flow rate through the gallery 82 restrain return movement of the diaphragm 71.

The lower end of the stem 74 terminates in a double piston, the valve member 73 being the lower and smaller diameter portion of the piston and the upper portion of larger diameter and designated 80 is arranged to move away from the walls within which it slides immediately upon upward movement of the stem 74 before the valve member 73 lifts sufficiently to open its valve. As soon as upper portion 80 moves upwardly away from its co-operating cylindrical surface, an annular surface between upper portion 80 and valve member 73 becomes subject to a hydraulic lifting force. This causes a snap action which is most desirable when the inlet pressure exceeds the outlet pressure in the respective zones 78 and 76 so as to quickly lift the valve member 73 from its valve seat.

When this occurs due to the pressure flowing from the conduit 77 into the inlet pressure zone 78, the valve member 73 opens and the vent aperture 52 vents the pressure fluid to the spool valve 56 which in turn actuates the ram 57 as described above.

Various modifications in structure and/or function can be made by one skilled in the art to the disclosed embodiments without departing from the scope of the invention as defined by the claims.

I claim:

1. Filter backwash means comprising: means designed, sized and arranged for effecting backwash of an irrigation system filter having inlet and outlet pipes, including:
   a pressure actuated dump valve have a housing, a valve seat in the housing, a dump valve member co-operable with the valve seat, and pressure actuated means operatively coupled between the dump valve member and housing and controlling opening or closing of the dump valve,
   a pressure actuated dump control pilot valve comprising a pilot valve housing, having a pilot valve seat, an inlet pressure zone and an outlet pressure zone within the pilot valve housing, an axially movable valve lifting member having pressure responsive means dividing said zones within the pilot valve housing, and a pilot valve member axially movable within and with respect to the valve lifting member and cooperable with said pilot valve seat,
   conduit means in fluid flow communication between said outlet pressure zone and said outlet pipe directing hydraulic pressure derived from said outlet pipe against said valve lifting member pressure response means to urge said valve lifting member in a closing direction of said pilot valve housing and the valve lifting member also urging the valve lifting member in said closing direction,
   further conduit means in fluid flow communication between said inlet pressure zone and said inlet pipe directing hydraulic pressure derived from said inlet pipe against said valve lifting member to urge said valve lifting member in an opening direction of said pilot valve but to urge said pilot valve member in a closing direction, a trigger spring coacting between said valve lifting member and pilot valve member and of such length to be operable to lift said pilot valve member from its pilot valve seat only after initial movement of said valve lifting member in said opening direction,
   and walls defining a vent aperture extending from said pilot valve seat directing a venting flow of fluid from said inlet pressure zone upon opening of said pilot valve due to increase of differential between the pressures in the inlet and outlet pressure zones, said venting flow so reducing the opening pressure controlling the dump valve that the dump valve again closes.

2. Filter backwash means according to claim 1 wherein said valve lifting member contains a central aperture with an upwardly facing shoulder supporting trigger spring, and wherein said pilot valve member comprises an upwardly extending stem which terminates at its upper end in a head, said stem extending through said central aperture and trigger spring, the length of said trigger spring being such that it bears upwardly against said head only after some initial upward movement of said valve lifting member has occurred.

3. Filter backwash means according to claim 1 wherein said pressure responsive means comprises a piston carried on said axially movable valve lifting member slidably and sealably engaging a surface in said pilot valve housing.

4. Filter backwash means according to claim 1 wherein said pressure responsive means comprises a diaphragm connected between said axially movable lifting member and said housing.

5. Filter backwash means comprising: means designed, sized and arranged for effecting backwash of an irrigation system filter having inlet and outlet pipes, including:
   a dump valve having a housing with inlet and outlet conduits, a valve seat in the housing between the inlet and outlet conduits, a dump valve member co-operable with the valve seat, a diaphragm joining the dump valve to the housing and defining a diaphragm space with the housing, and a metering aperture extending from the inlet conduit into the diaphragm space,
   a pilot valve having a pilot valve housing carried by the dump valve housing, the pilot valve housing containing an inner cylindrical wall, a pilot valve seat, a bleed aperture extending from the diaphragm space to an inlet pressure zone adjacent the valve seat, there being an axially movable valve lifting member within the pilot valve housing having a piston slidably and sealably engaging said cylindrical wall, and separating the inlet pressure zone from an outlet pressure zone within the housing, said valve lifting member having an upwardly facing shoulder, a conduit extending from the outlet pressure zone to said, outlet pipe,
   a valve member axially movable within the pilot valve housing and having a stem extending upwardly into the valve lifting member, a head surmounting the stem, and a trigger spring surrounding the stem and bearing downwardly against said upwardly facing shoulder and upwardly against said head only after initial upward movement of the valve lifting member,
   and a valve closure spring co-acting between said pilot valve housing and said valve lifting member urging said valve lifting member in a valve closure direction, there being a venting aperture external of said pilot valve seat and opening into the valve seat.

6. Filter backwash means according to claim 5 further comprising a conduit extending between said pilot valve housing and said outlet pipe and placing said outlet pipe into fluid flow communication with said outlet pressure zone.

7. Filter backwash means according to claim 6 further comprising a gallery extending from the inlet pressure zone adjacent the pilot valve seat to a space within said cylindrical wall and adjacent one face of said piston, the cross-sectional area of said gallery being sufficiently small to impede flow of liquid therethrough upon piston movement in the closing direction of the pilot valve.

8. Filter backwash means according to claim 7 further comprising a metering screw extending through the pilot valve housing and intercepting the gallery so as to adjust the rate of said flow of liquid therethrough.

9. Filter backwash means according to claim 5 further comprising a gallery extending from the inlet pressure zone adjacent the pilot valve seat to a space within said cylindrical wall and adjacent one face of said piston, the cross-sectional area of said gallery being sufficiently small to impede flow of liquid therethrough upon piston movement in the closing direction of the pilot valve and a metering screw extending through the pilot valve housing and intercepting the gallery so as to adjust the rate of said flow of liquid therethrough.

10. Filter backwash means comprising: means designed, sized and arranged for effecting backwash of an irrigation system filter having inlet and outlet pipes including:
a pressure actuated dump valve having a housing, a valve seat in the housing, a dump valve member co-operable with the valve seat, and a pressure actuated member coupled to the dump valve member for controlling opening and closing of the dump valve,
a pilot valve comprising a pilot valve housing having a pilot valve seat, a diaphragm within the housing dividing a space within the housing into an inlet pressure zone and an outlet pressure zone, a pilot valve member in the pilot valve housing co-operable with the valve seat therein for opening and closing of the pilot valve, a pilot valve lifting member carried by the diaphragm and having an upwardly facing shoulder, a stem extending upwardly from the pilot valve into the lifting member and terminating in a head, and a trigger spring surrounding the stem and bearing downwardly against said upwardly facing shoulder and upwardly against said head only after initial upward movement of the valve lifting member,
first and second conduits extending from the pilot valve housing respectively to said outlet pipe and said inlet pipe and placing said outlet pipe in fluid flow communication with said outlet pressure zone and said inlet pipe in fluid flow communication with said inlet pressure zone,
and a valve closure spring co-acting between said pilot valve housing and said diaphragm urging said valve lifting member in a pilot valve closure direction,
there being a venting aperture external of said pilot valve seat and opening into that seat.

11. Filter backwash means according to claim 10 wherein said pilot valve member comprises the smaller diameter and lower piston of a double piston which slidably and sealably engages co-operating cylindrical surfaces in said pilot valve member, the larger diameter and upper piston surmounting said lower piston and moving away from its respective said co-operating cylindrical surface upon upward movement of said pilot valve member to thereby be subject to an hydraulic lifting force exerted by hydraulic fluid in said inlet pressure zone.

12. A filter backwash means according to claim 9 wherein said venting aperture extends to a spool valve and conduit means extending between said spool valve and said pressure actuated member coupled to the dump valve, arranged so that venting flow of fluid pursuant to opening of said pilot valve actuates said spool valve which in turn operates said pressure actuated member.

13. A filter backwash means according to claim 11 wherein said venting aperture extends to a spool valve and conduit means extending between said spool valve and said pressure actuated member coupled to the dump valve, arranged so that venting flow of fluid pursuant to opening of said pilot valve actuates said spool valve which in turn operates said pressure actuated member.

* * * * *

UNITED STATES PATENT OFFICE
CERTIFICATE OF CORRECTION

Patent No. 4,477,343               Dated Oct. 16, 1984

Inventor(s) Alfred D. Tucker

It is certified that error appears in the above-identified patent and that said Letters Patent are hereby corrected as shown below:

Column 5, line 57, after "valve" insert -- , and a valve closure spring coacting between the pilot valve --

Column 6, line 57, after "a" insert -- pilot --

Signed and Sealed this

Thirteenth Day of August 1985

[SEAL]

Attest:

DONALD J. QUIGG

Attesting Officer

Acting Commissioner of Patents and Trademarks